Feb. 13, 1962     E. D. SNYDER ET AL     3,020,664
FISHING SIGNAL DEVICE
Filed May 13, 1960
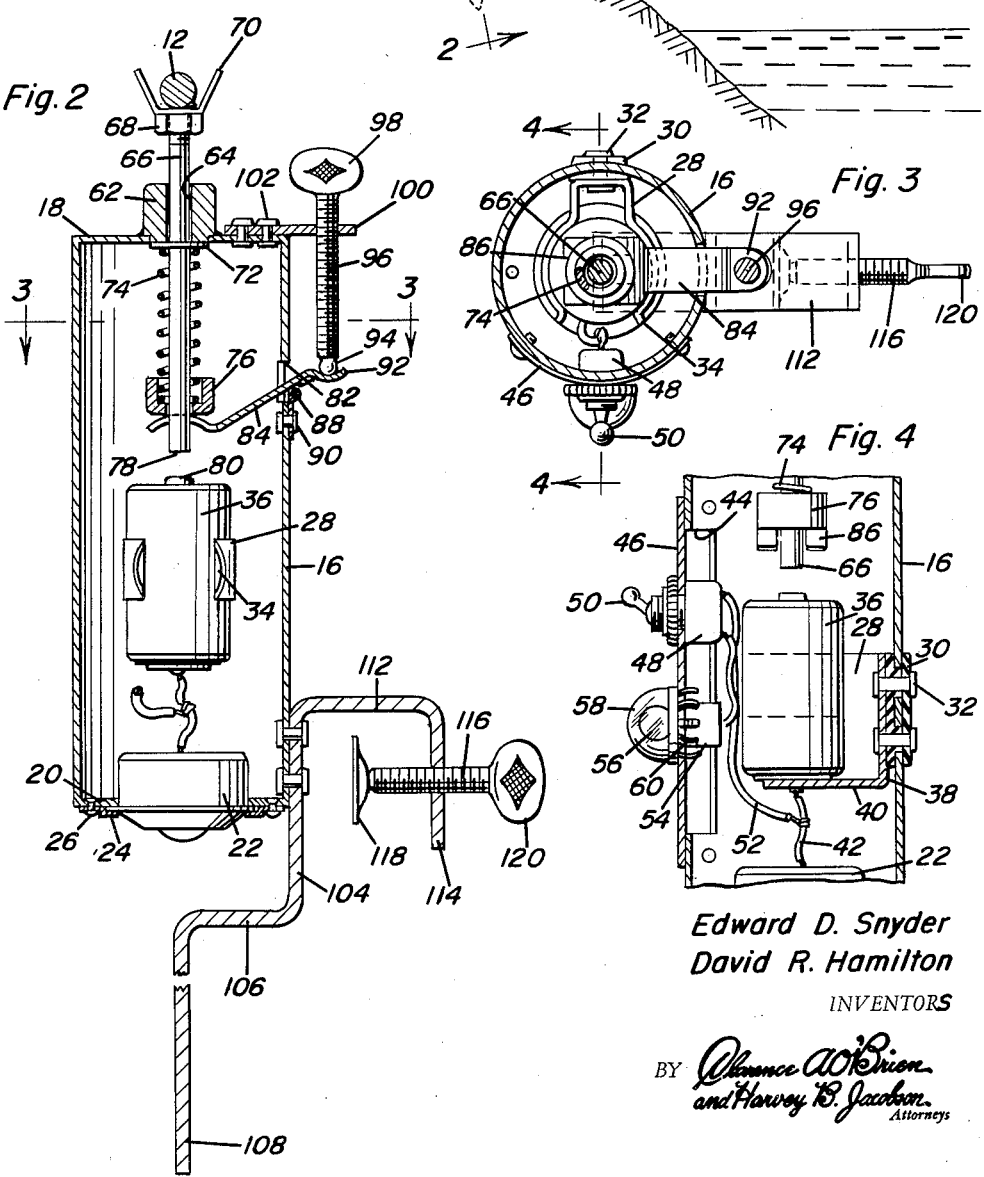
Edward D. Snyder
David R. Hamilton
INVENTORS

3,020,664
FISHING SIGNAL DEVICE
Edward D. Snyder and David R. Hamilton, both of Rte. 1, Ridgeley, W. Va.
Filed May 13, 1960, Ser. No. 29,039
6 Claims. (Cl. 43—17)

The present invention generally relates to a signal device and more particularly to a signal device for use by persons when fishing for providing either or both a visual signal and an audible signal when a pull, jerk or bite causes movement of the fishing line and rod.

The primary object of the present invention is to provide a signal device for use by fishermen which includes a novel mechanism for adjusting the signal device so that a varying force is necessary to operate the signal thereby permitting the signal device to be employed for use with different types of fishing rods, hand lines or the like and also for use with various types of bait, fish lures or the like and in various types of water, that is, swift water or still water.

Another feature of the present invention is to provide a signal device which is battery operated and which includes both an audible horn and a light forming a signal with the horn being primarily for use in the day time and the light being primarily for use in the night time but both of the devices being capable of use together or selectively individually.

Still another feature of the present invention is to provide a signal device having novel means for supporting the signal device from the gunwale of a boat or from the ground surface.

Still another object of the present invention is to provide a signal device in accordance with the preceding objects having a cradle for supporting the fishing rod or hand line with the cradle being carried by a reciprocating rod spring-biased upwardly with the rod forming a ground for a battery to a casing for completing a circuit to either the audible or visual signal means.

Still another important feature of the present invention is to provide a fishing signal device which is simple in construction, easy to use, easy to adjust, effective for its particular purposes and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating the fishing signal device of the present invention in use;

FIGURE 2 is a longitudinal, vertical sectional view, on an enlarged scale, taken substantially upon a plane passing along section line 2—2 of FIGURE 1 illustrating the details of construction of the signal device;

FIGURE 3 is a transverse, vertical sectional view taken substantially upon a plane passing along section line 3—3 of FIGURE 2 illustrating further structural details of the device; and FIGURE 4 is a vertical sectional view taken substantially upon a plane passing along section line 4—4 of FIGURE 3 illustrating further structural details of the light signal device and the switch mechanism therefor.

Referring now specifically to the drawings, the numeral 10 generally designates the fishing device of the present invention which is employed for supporting a fishing rod 12 having a fish line 14 thereon in an inclined manner whereby any force exerted on the fishing line 14 such as by a fish engaging the fish hook supported thereon will actuate the signal device.

The signal device 10 includes a generally cylindrical casing or housing 16 of a suitable electric current conducting material having an upper end 18 and a lower end 20. Mounted in the lower end 20 is a horn, buzzer or other audible signal device 22 retained in position by a retaining flange 24 and fasteners 26. Disposed above the lower end 20 of the casing 16 is a generally U-shaped spring clip 28 insulated from the casing or housing 16 by insulating elements 30 and mounted thereon by rivets or the like 32 extending through the insulating elements 30 and the bight portion of the U-shaped clip 28. The legs of the U-shaped clip 28 are outwardly bowed and terminate in outwardly flared terminal end portions 34 for detachable clipping engagement with a battery 36. The central portion of the clip also is provided with a depending leg 38 having an inwardly extending flange 40 which engages the bottom or base of the flashlight battery 36. Connected to the flange 40 is a wire 42 electrically connecting the base of the battery to the signal device 22 by virtue of it being attached to the signal device 22 and to the leg or flange 40 which is in electrical contact with the base of the battery 36.

The side portion of the casing 16 is provided with an enlarged opening 44 receiving a removable inspection and access plate 46 having mounted thereon a toggle switch body 48 having a switch arm 50 extending exteriorly thereof. One side of the switch 50 is connected to the wire 42 by a wire 52 and the other side of the switch 48 is connected with a light socket 54 having a bulb 56 therein whereby operation of the toggle switch arm 50 will electrically connect the bulb to the wire 42. The bulb 56 is protected by a cover 58 of transparent material and the cover 58 is sealingly connected to an opening in the inspection and access plate 46 and is retained in position by spring fingers 60.

The upper end 18 of the casing 16 is provided with a cylindrical adapter rigid therewith designated by numeral 62 including a longitudinal bore 64 slidably receiving a rod 66 having a nut 68 attached to the upper end thereof. The nut 68 is provided with an upwardly opening saddle 70 of generally U-shaped configuration with the legs of the saddle diverging upwardly and outwardly for receiving the fishing rod 12 therein. Mounted on the rod 66 inwardly of the adapter 62 is a flange 72 rigid therewith which forms an abutment for limiting the outward movement of the rod 66 and also forms a seat for a compression coil spring 74 disposed on the rod 66. The other end of the spring 74 is received in a cup-shaped member 76 slidably disposed on the rod 66 whereby the cup-shaped member 76 may be adjusted in relation to the rod 66 for varying the tension of the spring 74 thus varying the resistance to downward movement of the rod 66. The terminal end or lower end of the rod 66 is designated by numeral 78 and is disposed normally in closely spaced relation to the centrally disposed projecting contact 80 normally provided on the flashlight battery. When the terminal end 78 of the rod 66 engages the contact 80 on the flashlight battery 36, the circuit to the audible signal device 22 will be energized thus energizing the signal device 22 and also energizing the light 56 if the toggle switch 48 is in closed position.

For varying the position of the cup-shaped member 76 in relation to the rod 66 for varying the force required to compress the spring 74 to move the rod 66 inwardly, there is provided an aperture 82 in the casing 16 through which an arm 84 extends. The inner end of the arm 84 is bifurcated as designated by numeral 86 and also is provided with an arcuate configuration as clearly illustrated in FIGURE 2 with the convex surface of the bifurcated end of the arm 84 engaging the undersurface of the cup-shaped seat 76 whereby pivotal movement of the arm 84 will move the cup-shaped member 76 in relation to the casing 16 with the convex surface thereof engaging slidably with the undersurface of the cup-shaped member 76 thereby exerting an even and equal pressure on all areas of the cup-shaped member 76 within certain limits of arcuate movement of the arm.

Where the arm 84 extends through the opening 82, it is hingedly connected to the casing 16 by a hinge member 88 attached to the casing 16 by a fastener 90. The outer end of the arm 84 is provided with a concave recess 92 engaging the spherical end 94 of a screw-threaded member 96 which is in the form of an adjustment screw. The screw-threaded member 96 is provided with an enlarged blade-like handle 98 at the upper end thereof and is screw-threaded through a laterally extending lug 100 attached to the end 18 of the casing 16 by fasteners 102 or any other suitable means.

For supporting the casing 16, the lower portion of the casing is provided with a vertically disposed strap member 104 having an inwardly offset portion 106 at the lower end thereof together with a depending pointed end portion 108 extending longitudinally below the casing 16 generally in alignment with the center thereof for penetration of the ground surface 110 thus supporting the casing generally in upright or upwardly inclined relation as illustrated in FIGURE 1 on the bank of a body of water whereby the fishing rod may be supported in a convenient manner as illustrated in FIGURE 1 so that any downward force exerted on the fishing rod which is sufficient to overcome the tension of the spring 74 will operate the signal device. For mounting the casing 16 on the gunwale of a boat, the upper end of the strap member 104 is provided with an outward extension 112 having a depending flange or lug 114 at the outer end thereof threadedly receiving a clamp screw 116 having a saddle 118 on the inner end thereof and a handle 120 on the outer end thereof for movement in relation to the strap 104 for clamping engagement with the gunwale of a boat or for clamping engagement with a portion of a dock or the like.

Thus, the present invention may be mounted conveniently in any of several different positions and may be used with a rod and reel construction, a hand line, any type of fishing rod and fishing equipment in which it is desirable to signal or otherwise warn the fisherman that a greater force has been exerted on the fishing line or fishing rod than the normal forces caused by gravity and movement of the water thereby indicating to the fisherman that the fishing line requires his immediate attention. This enables the fisherman to engage in other pursuits without giving his full time and attention to the physical supporting of the fishing line. The device may be used in the daytime as well as for night time fishing and provides either an audible signal or a visual signal or may provide both an audible and a visual signal. The device may be constructed of any suitable materials but preferably of sufficient rigidity and strength to withstand the usual handling of such an article. Further, the device may be colored any vivid color for ease of identification and observation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing signal device comprising a casing, means on said casing for attachment to a supporting device, a signal device mounted on said casing, a battery within said casing and electrically connected to the signal device, said battery comprising a contact, a movable rod slidably mounted in the casing and terminating exteriorly thereof for movement in relation to the contact on the battery for grounding the battery upon inward movement of said rod thereby completing the circuit to the signal device, said rod including a saddle on the outer end thereof for engagement with a fishing device whereby pull on the fishing device such as would be exerted by a bite thereon will move the rod inwardly into contacting relation, spring means urging said rod outwardly away from the contact on the battery thereby preventing operation of the signal device until a force greater than the force of the spring means has been encountered by the fishing device, and a flange on the rod engageable with the casing for limiting the outward movement of said rod, said spring means including a coil spring encircling the rod and having one end thereof abutting against the flange on the rod, a collar slidable on the rod and abutting the other end of the coil spring, and an operating arm extending inwardly from the exterior of the casing and including a bifurcated inner end engaging the movable collar for moving the collar and compressing the spring for varying the force required to move the rod inwardly.

2. The combination of claim 1, together with a lug on the casing, said collar comprising a cup-shaped member receiving the end of the spring, the outer end of the arm engaging the collar including means pivotally connecting the arm to the casing, the terminal outer end having a recess, a screw-threaded member, said screw-threaded member having a spherical member on the bottom end thereof and having the central portion threaded through said lug thereby pivoting the arm and adjusting the tension of the spring upon rotation of the screw-threaded member.

3. The combination of claim 2 wherein said signal is in the form of an audible signal, said casing having an enlarged inspection aperture therein for access to the battery, a closure plate for the opening, a toggle switch mounted on the plate, an illumination device mounted on the plate with the illumination device, toggle switch and battery being in series for energizing the illuminating device when the switch is closed and when the battery is grounded.

4. The combination of claim 3 wherein said means for supporting the casing includes a depending pointed member for insertion into the ground.

5. The combination of claim 3 wherein said means for supporting the casing includes a U-shaped clamp for engagement with the gunwale of the boat.

6. A fishing signal device comprising a casing of electric current conducting material, an electric signal in the casing electrically connected thereto, a battery in the casing having one pole electrically connected to said signal, a metallic rod extending slidably into the casing in contact therewith, said rod being longitudinally aligned with the battery and engageable with the other pole thereof for energizing the signal, a coil spring encircling the rod and operatively connected thereto for yieldingly disengaging same from the battery, means on the rod for operatively connecting a fishing device thereto for actuation thereby for engaging said rod with the battery, and means for regulating the tension of the spring, the last-named means including a member slidably mounted on the rod and engaged with one end of the spring, an arm pivotally mounted at an intermediate point on the casing and having one end portion operatively connected to said member, and an adjusting screw threadedly mounted on the casing and operatively connected to the other end portion of said arm for actuating same.

References Cited in the file of this patent

UNITED STATES PATENTS

| | | |
|---|---|---|
| 2,722,076 | Benedetti | Nov. 1, 1955 |
| 2,741,055 | Weber | Apr. 10, 1956 |
| 2,745,088 | Bauer | May 8, 1956 |
| 2,816,387 | Crowe et al. | Dec. 17, 1957 |